United States Patent
Bhamri et al.

(10) Patent No.: US 12,537,577 B2
(45) Date of Patent: Jan. 27, 2026

(54) CHANNEL STATE INFORMATION PROCESSING AND REPORTING

(71) Applicant: Lenovo (Singapore) PTE. LTD., New Tech Park (SG)

(72) Inventors: Ankit Bhamri, Rödermark (DE); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 562 days.

(21) Appl. No.: 17/919,484

(22) PCT Filed: Apr. 16, 2021

(86) PCT No.: PCT/IB2021/053166
§ 371 (c)(1),
(2) Date: Oct. 17, 2022

(87) PCT Pub. No.: WO2021/209972
PCT Pub. Date: Oct. 21, 2021

(65) Prior Publication Data
US 2023/0208489 A1 Jun. 29, 2023

Related U.S. Application Data

(60) Provisional application No. 63/011,207, filed on Apr. 16, 2020.

(51) Int. Cl.
*H04B 7/06* (2006.01)
*H04L 27/26* (2006.01)

(52) U.S. Cl.
CPC ..... *H04B 7/0626* (2013.01); *H04L 27/26025* (2021.01)

(58) Field of Classification Search
CPC .... H04B 7/0626; H04B 17/24; H04B 7/0695; H04B 7/06; H04B 17/309;
(Continued)

(56) References Cited

U.S. PATENT DOCUMENTS

| 2020/0274639 | A1* | 8/2020 | Yang | H04L 1/1671 |
| 2022/0321189 | A1* | 10/2022 | Wei | H04B 7/0632 |
| 2023/0038113 | A1* | 2/2023 | Hosseini | H04W 24/10 |

FOREIGN PATENT DOCUMENTS

| CN | 110536315 A | 12/2019 |
| EP | 3562056 A1 | 10/2019 |
| WO | 2019006031 A1 | 1/2019 |

OTHER PUBLICATIONS

PCT/IB2021/053166, "Notification of Transmittal of the International Search Report and the Written Opinion of the International Searching authority, or the Declaration", International Searching Authority, Jun. 21, 2021, pp. 1-14.
(Continued)

*Primary Examiner* — Robert C Scheibel
*Assistant Examiner* — Muhammad Ainul Huda
(74) *Attorney, Agent, or Firm* — Kunzler Bean & Adamson

(57) ABSTRACT

Apparatuses, methods, and systems are disclosed for channel state information processing and reporting. One method (700) includes determining (705), at a user equipment ("UE"), an availability of channel state information ("CSI") processing units on a sub-symbol level where a duration of the sub-symbol being less than a symbol duration that corresponds to a subcarrier spacing of an uplink ("UL") channel for transmission of at least one corresponding CSI report. The method (700) includes processing (710) the at least one corresponding CSI report on the determined available CSI processing units in response to a number of CSI processing units becoming available at the sub-symbol level being equal to or greater than a number of CSI processing units needed for processing the at least one corresponding CSI report.

20 Claims, 7 Drawing Sheets

(58) Field of Classification Search
CPC ............. H04L 27/26025; H04L 1/0027; H04L 1/0031; H04L 1/0036; H04L 1/0026; H04L 5/0048; H04L 5/0064; H04W 24/10; H04W 72/23; H04W 48/12
See application file for complete search history.

(56) References Cited

OTHER PUBLICATIONS

3GPP, "3rd Generation Partnership Project; Technical Specification Group Radio Access Network; Physical layer procedures for shared spectrum channel access (Release 16)", 3GPP TS 37.213 V16.1.0, Mar. 2020, pp. 1-25.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; User Equipment (UE) radio access capabilities (Release 16)", 3GPP TS 38.306 V16.0.0, Mar. 2020, pp. 1-64.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

3GPP, "3rd Generation Partnership Project; Technical Specification Group Radio Access Network; NR; Requirements for support of radio resource management (Release 16)", 3GPP TS 38.133 V16.3.0, Mar. 2020, pp. 1-1169.

Lenovo, Motorola Mobility, "Discussion on physical layer impacts for NR beyond 52.6 GHz", 3GPP TSG RAN WG1 #103-e R1-2007558, Oct. 26-Nov. 13, 2020, pp. 1-19.

Qualcomm, "New WID on Extending current NR operation to 71 GHz", 3GPP TSG RAN Meeting #86 RP-193229, Dec. 9-12, 2019, pp. 1-5.

Nokia, Nokia Shanghai Bell, "New WID on enhanced Industrial Internet of Things (IoT) and URLLC support", 3GPP TSG RAN Meeting #86 RP-193233, Dec. 9-12, 2019, pp. 1-5.

Intel Corp., "New SID: Study on supporting NR from 52.6GHz to 71 GHz", 3GPP TSG RAN Meeting #86 RP-193259, Dec. 9-12, 2019, pp. 1-3.

* cited by examiner

CHANNEL STATE INFORMATION PROCESSING AND REPORTING

CROSS-REFERENCE TO RELATED APPLICATIONS

This application claims priority to U.S. Patent Application Ser. No. 63/011,207 entitled "FAST CSI PROCESSING" and filed on Apr. 16, 2020, for Ankit Bhamri and Hyejung Jung, which is incorporated herein by reference in its entirety.

FIELD

The subject matter disclosed herein relates generally to wireless communications and more particularly relates to channel state information ("CSI") processing and reporting.

BACKGROUND

In certain wireless communication systems, communication is expected to be supported for very high frequency range such as beyond 52.6 GHz. Furthermore, communication is also supported industrial internet of things ("IIoT") and ultra-reliable low-latency communication ("URLLC") service types. However, such frequency range and services may require CSI reporting that is not satisfied by conventional procedures.

BRIEF SUMMARY

Disclosed are apparatuses, methods, and systems for channel state information processing and reporting. A method, in one embodiment, includes determining, at a user equipment ("UE"), an availability of channel state information ("CSI") processing units on a sub-symbol level where a duration of the sub-symbol being less than a symbol duration that corresponds to a subcarrier spacing of an uplink ("UL") channel for transmission of at least one corresponding CSI report. A method, in further embodiments, includes processing the at least one corresponding CSI report on the determined available CSI processing units in response to a number of CSI processing units becoming available at the sub-symbol level being equal to or greater than a number of CSI processing units needed for processing the at least one corresponding CSI report.

An apparatus, in one embodiment, includes a transceiver that, in one embodiment, is operable to communicate with a wireless mobile network to receive at least one channel state information ("CSI") reference signal. In further embodiments, the first apparatus includes a processor that determines, in response to the CSI reference signal, an availability of CSI processing units on a sub-symbol level where a duration of the sub-symbol being less than a symbol duration that corresponds to a subcarrier spacing of an uplink ("UL") channel for transmission of at least one corresponding CSI report. In further embodiments, the processor processes the at least one corresponding CSI report on the determined available CSI processing units in response to a number of CSI processing units becoming available at the sub-symbol level being equal to or greater than a number of CSI processing units needed for processing the at least one corresponding CSI report.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
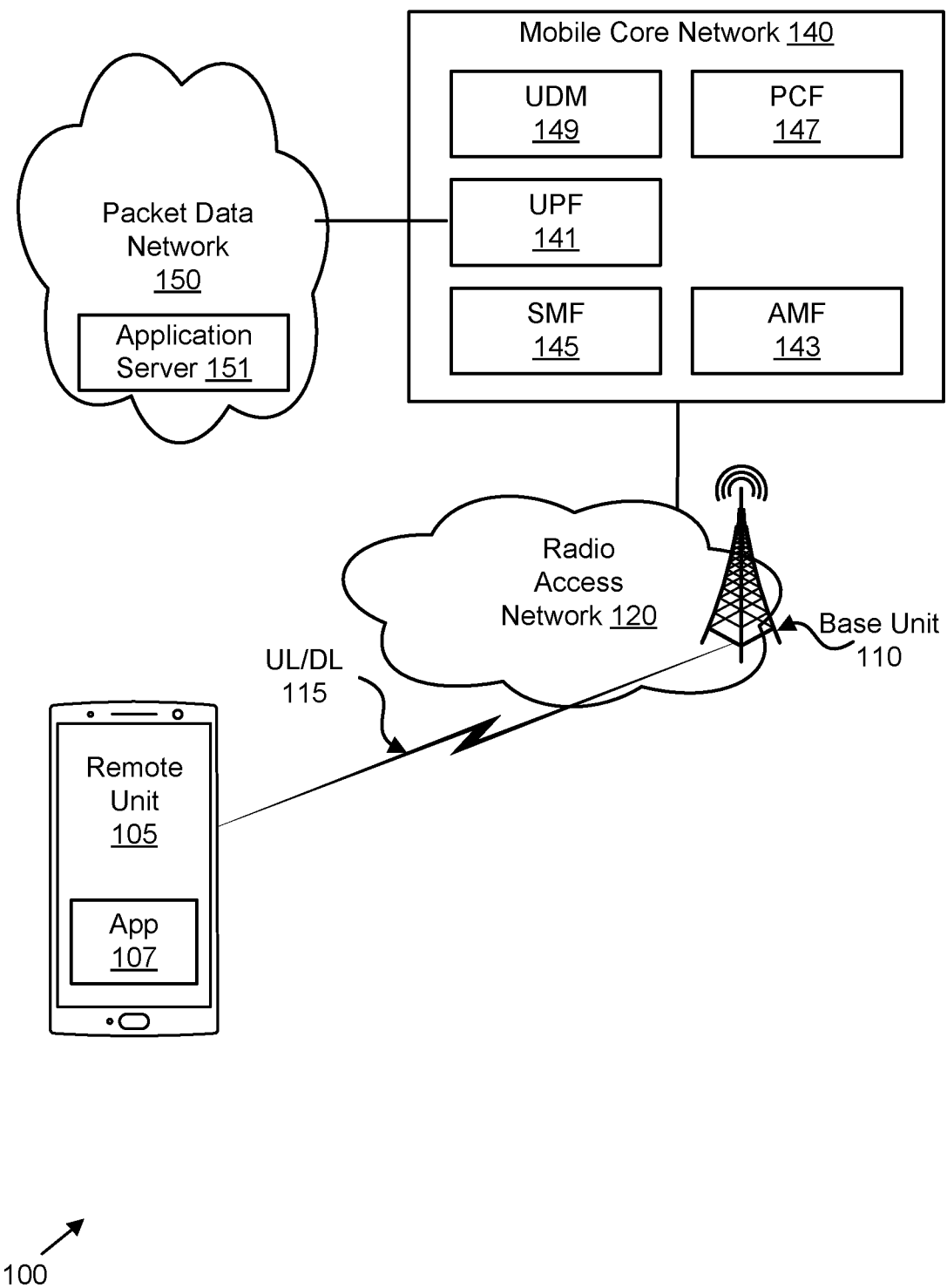
FIG. 1 is a schematic block diagram illustrating one embodiment of a wireless communication system for channel state information processing and reporting.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for supporting channel state information processing and reporting and/or reporting. In various embodiments, physical layer feedback is enhanced for IIoT and URLLC, thereby allowing for more accurate modulation and coding scheme ("MCS") selection.

Additionally, new radio ("NR") existing downlink ("DL") and uplink ("UL") waveforms may be adapted to support operation between 52.6 GHz and 71 GHz. For example, applicable numerology (including subcarrier spacing) and/or channel bandwidth (including maximum bandwidth) may be adapted for operation at the higher-frequency ranges (e.g., 52.6 GHz to 71 GHz). However, radio frequency ("RF") impairments at these frequencies require changes to support system functionality, especially impacting the physical layer. Specifically, timeline-related aspects are adapted to each numerology, for example, bandwidth part ("BWP") and beam switching times, hybrid automatic repeat request ("HARQ") scheduling, user equipment ("UE") processing, preparation, and computation times for physical downlink shared channel ("PDSCH"), physical uplink shared channel ("PUSCH")/sounding reference signal ("SRS") and CSI.

In one embodiment, the subject matter disclosed herein provides for CSI processing unit availability/occupancy on a sub-symbol level or on shortest symbol duration (e.g., corresponding to highest subcarrier spacing ("SCS") supported by UE) to allow much finer utilization of CPUs by UE and potentially reduce latency. In further embodiments, the subject matter disclosed herein provides for CSI multiplexing on PUSCH where multiplexing of multi-part CSI reporting with multi-PUSCH transmissions/repetitions is proposed to utilize shorter CSI processing time for each part and transmit them on corresponding transmission occasion and partial multiplexing of CSI with PUSCH is proposed where the starting symbol for CSI multiplexing with PUSCH can be later than the first symbol of PUSCH, depending up on the CSI processing timeline.

Disclosed herein are solutions for mitigating the impact of ultra-low latency operation and higher frequency operation on the system design. More specifically, the following are considered for supporting fast CSI reporting and CSI processing timeline. For URLLC applications, it has been identified that highly accurate MCS is necessary to ensure the target performance requirements are met and therefore, faster CSI reporting is very crucial. As higher subcarrier spacings (higher numerologies) are added for NR in frequency range 2 ("FR2") and beyond, CSI processing timeline involving multiple numerologies can potentially be further enhanced to allow low latency CSI processing when the UE is required to report multiple CSI reports associated with multiple numerologies.

In some embodiments, CSI is reported aperiodically, for example in response to downlink control information ("DCI"). In some embodiments, the UE procedure for reporting CSI may be as specified in section 5.2 in 3GPP TS 38.214 (v16.0.0), which is incorporated herein by reference.

Regarding CSI reporting, the UE may indicate the number of supported simultaneous CSI calculations $N_{CPU}$. If a UE supports $N_{CPU}$ simultaneous CSI calculations it is said to have $N_{CPU}$ CSI processing units for processing CSI reports across all configured cells. If L CPUs are occupied for calculation of CSI reports in a given orthogonal frequency division multiplexing ("OFDM") symbol, the UE has $N_{CPU}-L$ unoccupied CPUs. If N CSI reports start occupying their respective CPUs on the same OFDM symbol on which $N_{CPU}-L$ CPUs are unoccupied, where each CSI report n=0, . . . , N−1 corresponds to $O_{CPU}^{(n)}$, the UE is not required to update the N-M requested CSI reports with lowest priority (according to Clause 5.2.5), where 0≤M≤N is the largest value such that $$\sum_{n=0}^{M-1} O_{CPU}^{(n)} \le N_{CPU} - L$$

holds.

Processing of a CSI report occupies a number of CPUs for a number of symbols as follows: for a CSI report with CSI-ReportConfig with higher layer parameter reportQuantity set to 'cri-RI-PMI-CQI', 'cri-RI-i1', 'cri-RI-i1-CQI', 'cri-RI-CQI', or 'cri-RI-LI-PMI-CQI', if a CSI report is aperiodically triggered without transmitting a PUSCH with either transport block or HARQ acknowledgement ("HARQ-ACK") or both when L=0 CPUs are occupied, where the CSI corresponds to a single CSI with wideband frequency-granularity and to at most 4 CSI reference signal ("CSI-RS") ports in a single resource without CSI-RS resource index ("CRI") report and where codebook Type is set to 'typeI-SinglePanel' or where reportQuantity is set to 'cri-RI-CQI', $O_{CPU}=N_{CPU}$, otherwise, $O_{CPU}=K_s$, where $K_s$ is the number of CSI-RS resources in the CSI-RS resource set for channel measurement. Per 3GPP TS 38.214 (v16.0.0), in any slot the UE is not to have more active CSI-RS ports or active CSI-RS resources than reported as capability.

Regarding CSI processing, a UE is to perform aperiodic CSI reporting using PUSCH on serving cell c upon successful decoding of a DCI format 0_1 or DCI format 0_2 which triggers an aperiodic CSI trigger state. When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH. An aperiodic CSI report carried on the PUSCH supports wideband, and sub-band frequency granularities. An aperiodic CSI report carried on the PUSCH supports Type I, Type II and Enhanced Type II CSI.

In one embodiment, the CSI processing timeline is specified where the processing delay is defined in terms of number of symbols. The symbols are depending up on the subcarrier spacing applied for CSI-RS transmission, CSI reporting and physical downlink control channel ("PDCCH") triggering the CSI report (for aperiodic or semi-persistent reporting). Depending up on the UE capability in terms of number of CSI processing units ("CPUs") in each symbol (parallel processing capability), not all the triggered reports are always processed. If all the CPUs are occupied on a given symbol, then the remaining low priority reports are not required by UE to be processed.

However, from a UE perspective, a symbol can correspond to different durations depending up on the corresponding numerologies for each CSI report. For lower subcarrier spacing, a symbol with relatively longer duration might only have CPU occupied partially when the CPU is used for CSI processing associated with very high subcarrier spacing. Therefore, it may not be optimal to disregard the processing of CSI reporting in such scenarios. When a UE is expected to process/prepare for transmissions associated with different subcarrier spacings, e.g., ranging from 15 kHz to possibly 960 kHz in a parallel manner, then enhancements could be considered on how to efficiently utilize UE's limited processing capability to reduce latency and handle processing/preparation of transmissions associated with multiple numerologies.

For example, at a SCS value of 15 kHz, CPU availability is checked at beginning of symbol N, and the corresponding CSI report is not processed since at that point there is no availability. UE waits until next symbol (e.g., corresponding 15 kHz SCS value) to check the availability again. CPU is occupied to process CSI report associated with SCS value of 480 kHz. However, the CPU is released once the processing is done for CSI report associated with 480 kHz SCS value and it becomes available for processing other CSI reports. But based on current specification, the UE would still wait for the beginning of next symbol corresponding to a 15 kHz SCS value to check availability, although the CPU became available somewhere in the middle of the symbol where it is initially checked. This is inefficient.

FIG. 1 depicts a wireless communication system 100 for channel state information processing and reporting, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1A, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via UL and DL communication signals. Furthermore, the UL and DL communication signals may be carried over the wireless communication links 115. Here, the RAN 120 is an intermediate network that provides the remote units 105 with access to the mobile core network 140. As described above, the wireless communication links 115 may employ higher-frequency radio, e.g., in the 52.6 GHz to 71 GHz ranges. One or more CSI-RS may be carried on DL communication signals. Moreover, CSI reporting may be carried on UL communication signals. The wireless communication links 115 may be implemented using OFDM-based signaling, as described herein.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for irregular resource element mapping apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term "gNB" is used for the base station but it is replaceable by any other radio access node, e.g., RAN node, eNB, BS, eNB, gNB, AP, NR, etc. Further the operations are described mainly in the context of 5G NR. However, the proposed solutions/methods are also equally applicable to other mobile communication systems supporting radio communications at higher frequency ranges.

Figure 2:
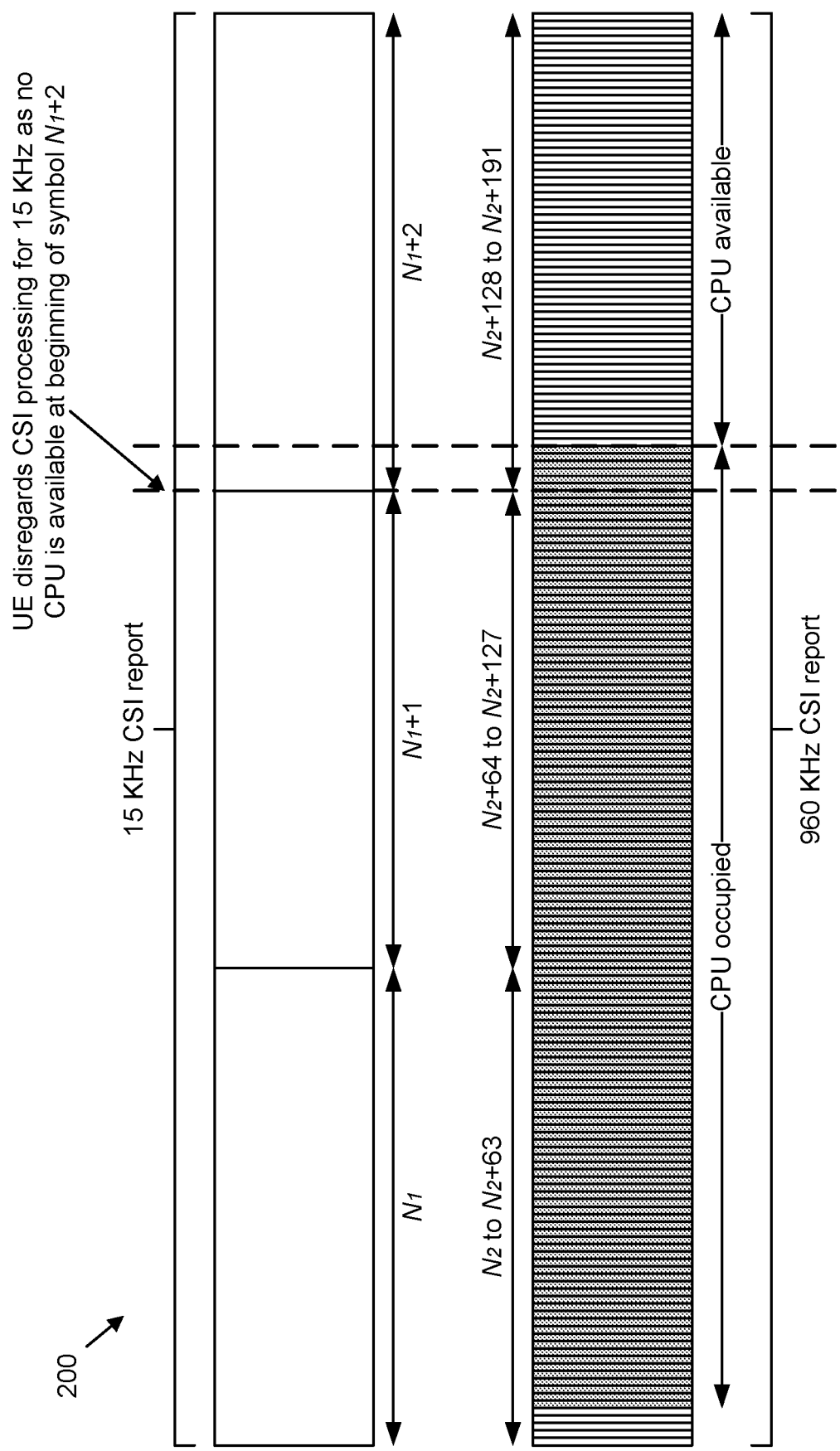
FIG. 2 is a diagram illustrating one embodiment of CSI report processing and CSI processing unit ("CPU") occupancy/availability for different numerologies.

FIG. 2 depicts a first example 200 of CSI report processing and CPU occupancy/availability for different numerologies. Currently the CSI processing timeline is also specified where the processing delay is defined in terms of number of symbols. The symbols are depending up on the subcarrier spacing applied for CSI-RS transmission, CSI reporting and PDCCH triggering the CSI report (for aperiodic or semi-persistent reporting). Depending up on the UE capability in terms of number of CSI processing units (CPUs) in each symbol (parallel processing capability), not all the triggered reports are always processed. If all the CPUs are occupied on a given symbol, then the remaining low priority reports are not required by UE to be processed.

However, from a UE perspective, a symbol can correspond to different durations depending on the corresponding numerologies for each CSI report. For lower subcarrier spacing, a symbol might only have CPU occupied partially when there is another CSI processing that is associated with very high subcarrier spacing, as shown in FIG. 2. Therefore, it is not optimal to disregard the processing of CSI reporting in such scenarios.

Additionally, 5G NR supports a relatively fast CSI report, for example, which is for up to four ports and is subject to several restrictions in comparison to other CSI reports. However, this might still not be enough to satisfy the requirements in terms of more accurate fast CSI. Especially when a CSI reporting quantity, for example channel quality information ("CQI")/precoding matrix indicator ("PMI"), is to be reported for a single wideband or multiple sub-bands occupying the entire band, the processing delay could be high, especially for higher frequency range with potentially large BWP. Also, multi-part reporting of CSI has been specified in NR, but that is mainly limited to the cases when the size of CSI report is quite large, and it is not possible to transmit within a single instance of UL transmission.

Figure 3:
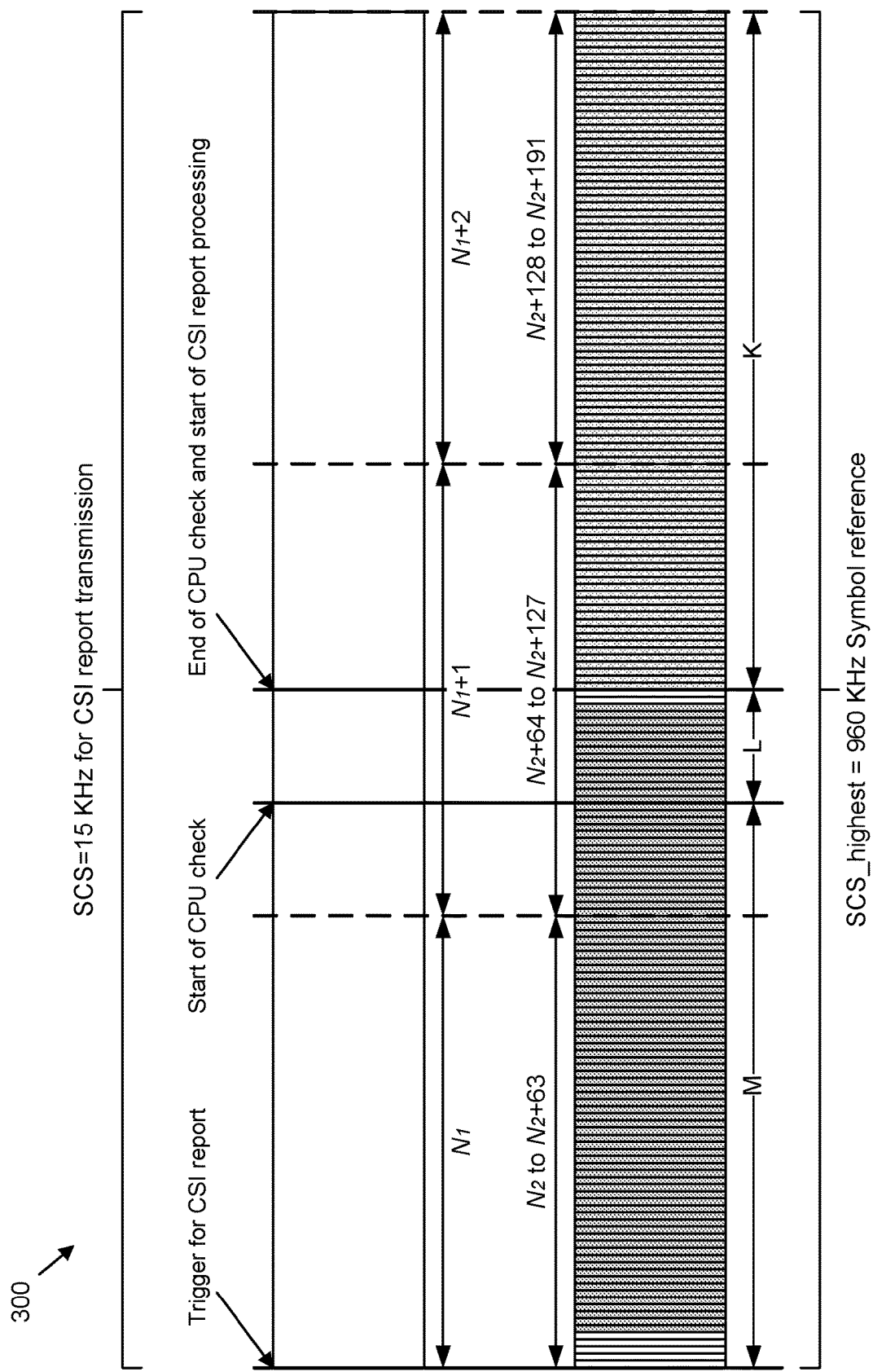
FIG. 3 is a diagram illustrating one embodiment of CSI report processing and CPU occupancy/availability check based on symbol durations of highest supported Subcarrier Spacing ("SCS") by UE.

FIG. 3 depicts an example 300 of CSI report processing and CPU occupancy/availability check based on symbol durations of highest supported SCS by UE. According to a first solution, CSI reporting is based on a highest SCS/numerology-based CSI processing unit occupancy/availability for all CSI reports. Here, the UE is configured to check for availability or occupancy for CSI processing units for a multiple of a symbol duration corresponding to the highest SCS value supported by UE (or configured by gNB), regardless of the subcarrier spacing associated with a given CSI report transmission on PUSCH/physical uplink control channel ("PUCCH").

In one example implementation of the first solution, as shown in FIG. 3, a UE is capable or configured to support highest subcarrier ("SCS") spacing $SCS_{highest}$ (e.g., 960 kHz in FIG. 3) and when a CSI report (e.g., for corresponding transmission on a lower SCS=15 kHz on PUSCH/PUCCH) is triggered that would require $N_{cpu}$ CSI processing units for a duration of K symbols, where the duration of K symbols (e.g., 96 symbols in FIG. 3) is corresponding to the subcarrier spacing $SCS_{highest}$, then the UE checks M symbols after the triggering of the CSI report whether $N_{cpu}$ CSI processing units are available or not, where symbol M (e.g., 80 symbols in FIG. 3) corresponds to the subcarrier spacing $SCS_{highest}$. If the required number of CPUs are not available, then the UE waits for the next L symbols (e.g., 16 symbols in FIG. 3) to wait for availability, where the UE is pre-configured and/or configured/indicated with L symbols corresponding to the subcarrier spacing $SCS_{highest}$ (e.g., 960 kHz in FIG. 3). The value of L can be a function of different subcarrier spacings corresponding to different CSI reporting and the maximum subcarrier spacing supported by the UE, as shown in example Table 1.

TABLE 1

Example of pre-configured CPU checking
duration in terms of number of symbols L
corresponding to $SCS_{highest}$ = 960 kHz

| SCS for CSI reporting | Checking duration in terms of number of symbols L |
|---|---|
| 15 kHz | 16 |
| 30 kHz | 8 |
| 60 kHz | 4 |
| 120 kHz | 2 |
| 240 kHz | 1 |
| 480 kHz | 1 |
| 960 kHz | 1 |

Figure 4:
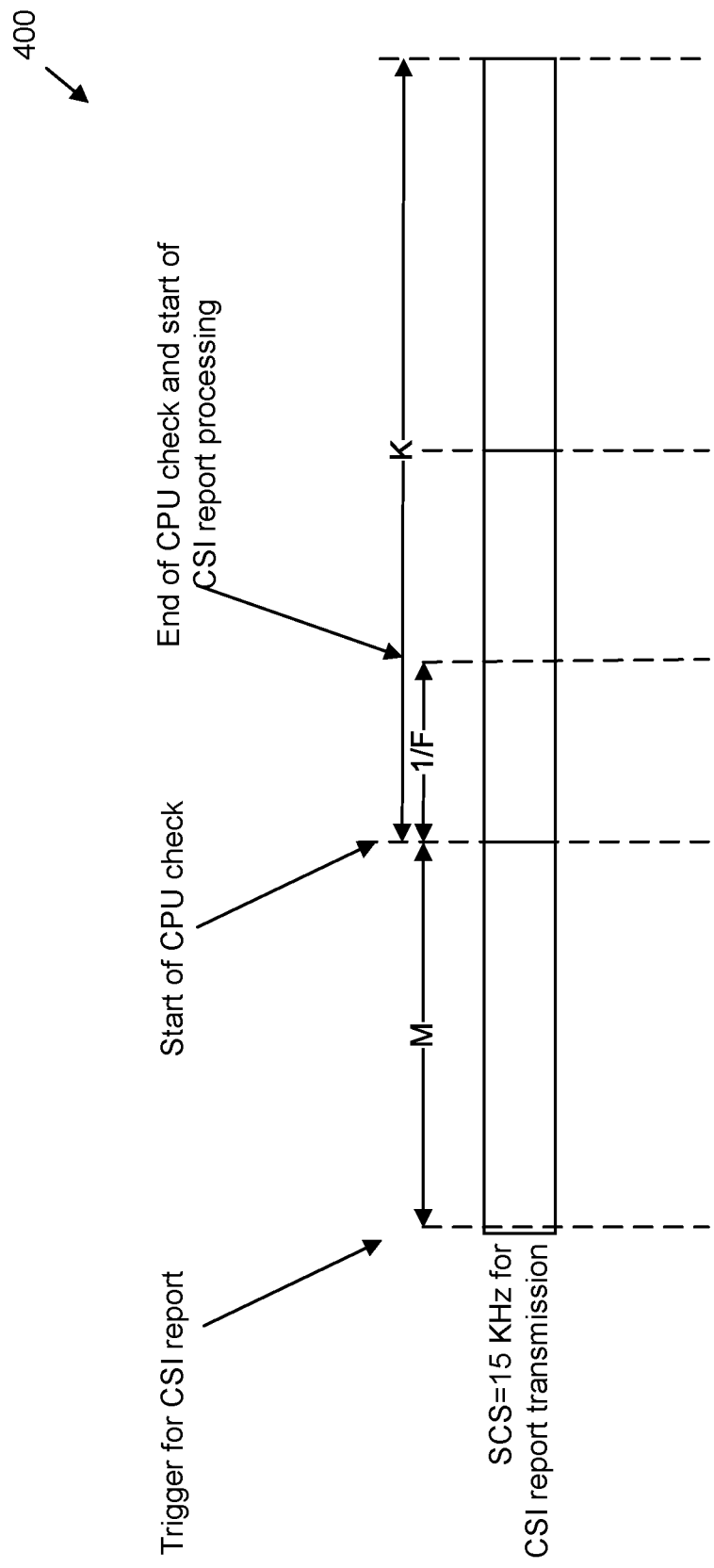
FIG. 4 is a diagram illustrating one embodiment of CSI report processing and CPU occupancy/availability check based on sub-symbol duration.

FIG. 4 depicts one example 400 of CSI report processing and CPU occupancy/availability check based on sub-symbol duration. According to a second solution, a UE is configured with sub-symbol level availability or occupancy for CSI processing units e.g., when a given CPU is occupied for 1/F fraction of a symbol duration, then the UE is expected to utilize the CPU after 1/F fraction of the symbol duration for processing CSI report updates. The symbol duration corresponds to the subcarrier spacing to be used for a given CSI reporting transmission on PUSCH/PUCCH.

In one example implementation of the second solution, as shown in FIG. 4, a UE is capable or configured to support the highest SCS spacing $SCS_{highest}$ configured for the UE and when a CSI report is triggered that would require $N_{cpu}$ CSI processing units for a duration of K symbols (e.g., 2 symbols in FIG. 4), where the duration of K symbols corresponds to the subcarrier spacing $SCS_1$ (e.g., 15 kHz in FIG. 4) associated with the CSI report transmission on PUSCH/PUCCH, then the UE checks at symbol M (e.g., 1 symbol in FIG. 4) after the triggering of the CSI report whether $N_{cpu}$ CSI processing units are available or not, where symbol M corresponds to the subcarrier spacing $SCS_1$. If the required number of CPUs are not available, then the UE waits 1/F the duration of symbol M (e.g., F=2 in FIG. 4) for availability, where the UE is pre-configured and/or configured/indicated with the value of F. The value of F may be a function of different subcarrier spacings corresponding to different CSI reporting and the maximum subcarrier spacing supported by the UE, as shown in example Table 2.

TABLE 2

Example of pre-configured CPU checking
duration in terms of fraction of symbol
duration 1/F when $SCS_{highest}$ = 960 kHz

| SCS for CSI reporting | Checking duration in terms of fraction 1/F of symbol duration for SCS for CSI reporting |
|---|---|
| 15 kHz | 1/4 |
| 30 kHz | 1/4 |
| 60 kHz | 1/2 |
| 120 kHz | 1/2 |
| 240 kHz | 1/1 |
| 480 kHz | 1/1 |
| 960 kHz | 1/1 |

According to a third solution, a UE implements channel state information processing and reporting with multi-PUSCH scheduling. Here, when multiple PUSCH transmissions are scheduled by a single DCI, then UE can be configured to transmit multi-part CSI report where each part can be transmitted on each of the PUSCH transmissions, where the CSI processing timeline for each part of the CSI report should be sufficient to allow corresponding multiplexing on each PUSCH transmission. For example, a first part of a CSI report would only need to be ready for transmission on a first PUSCH transmission and a second part of the CSI report would only need to be ready for transmission on the second PUSCH transmission, and so on. For each of the PUSCH transmissions scheduled by a single DCI, either data can be multiplexed with CSI or the CSI can be transmitted without data for any of the PUSCH transmissions.

In a first example implementation of the third solution, for aperiodic CSI reports, the reportQuantity is set to 'cri-RI-CQI' and cqi-FormatIndicator is set to 'subbandCQI' for 'N' subbands and 'M' CSI-RS ports. When the UE is configured/triggered for multi-part CSI reporting with 'K' PUSCH transmissions by a single DCI, then each part of the CSI report consists of 'cri-RI-CQI' for a multiple of subbands, When N mod K is equal to 0, then all the subbands are equally divided over PUSCH transmissions, where the CSI report for the first set of subbands is transmitted on a first PUSCH transmission for 'M' CSI-RS ports, the second set of subbands on a second PUSCH transmission, and so on. When N mod K=N' (where N'>0), then the CSI report for the last 'N' subbands is transmitted on corresponding last N' PUSCH transmissions.

In a second example implementation of the third solution, for aperiodic CSI reports, the reportQuantity is set to 'cri-RI-CQI' and cqi-FormatIndicator is set to 'widebanbandCQI' for 'M' CSI-RS ports. When the UE is configured/triggered for multi-part CSI reporting with 'K' PUSCH transmissions by a single DCI, then each part of the CSI report consists of 'cri-RI-CQI' for a multiple of CSI-RS ports. For example, if there are 16 CSI-RS ports and a total of 4 PUSCH transmissions, then the first transmission can provide the reporting quantities for CSI-RS ports up to 3, the second transmission can provide the reporting quantities for CSI-RS ports up to 4, the third transmission can provide the reporting quantities for CSI-RS ports up to 8, and the last transmission can provide the reporting quantities for CSI-RS ports up to 16.

In a third example implementation of the third solution, for aperiodic CSI report, the reportQuantity is set to 'cri-RI-PMI-CQI' and cqi-FormatIndicator is set to 'widebanbandCQI' and pmi-FormatIndicator is set to 'widebandPMI' for 'M' CSI-RS ports. When the UE is configured/triggered for multi-part CSI reporting with 'K' PUSCH transmissions by a single DCI, then the number of PUSCH transmissions can be divided in to two parts (of equal or unequal size), where the first part of the transmission can be used to report only the CQI over different multiples of 'M' CSI-RS ports and the second part of the transmission can be used to report only the PMI over different multiples of 'M' CSI-RS ports.

According to a fourth solution, a UE implements channel state information processing and reporting with PUSCH repetitions. Here, when multiple PUSCH repetitions are scheduled/activated by a single DCI, the UE can be configured to transmit a multi-part CSI report where each part can be transmitted on each of the PUSCH repetitions, where the CSI processing timeline for each part of the CSI report should be sufficient to allow corresponding multiplexing on each of PUSCH repetition. For example, a first part of a CSI report would only need to be ready for transmission on a first PUSCH transmission and a second part of the CSI report would only need to be ready for transmission on a second PUSCH transmission, and so on. For each of the PUSCH repetitions, data may be multiplexed with CSI, where the data is the same transport block ("TB") repeated over multiple transmission occasions, but the CSI is different parts of the triggered CSI report over multiple transmission occasions.

In an alternate embodiment of the fourth solution, when PUSCH repetition type B is configured/indicated, then the number of parts for multiple CSI reports are configured according to the number of nominal repetitions that are initially indicated/configured to the UE. In one example implementation of this alternate embodiment, when there is a segmentation of a nominal repetition into multiple actual repetitions as specified for PUSCH repetition type B, the CSI report part to be transmitted on the nominal repetition 'k' is now transmitted fully on the first of the actual repetition 'k1' of the corresponding nominal repetition 'k' and repeated on other actual repetitions 'k2', 'k3', and so on of the corresponding nominal repetition 'k'.

In another example implementation of this alternate embodiment, when there is a segmentation of a nominal repetition into multiple actual repetitions, the CSI report part to be transmitted on the nominal repetition 'k' is now transmitted fully on the first of the actual repetition 'k1' of the corresponding nominal repetition 'k' and next parts of the CSI report (that were initially intended for next nominal repetition) are transmitted on other actual repetitions 'k2', 'k3' and so on of the corresponding nominal repetition 'k', provided there is sufficient CSI processing time for all the parts corresponding to actual transmission occasion. If the CSI processing time is not sufficient, then the CSI parts are transmitted as initially configured with respect to the starting symbol for each of the nominal repetitions.

Please note that the example implementations described above on how the reporting quantities are reported in multiple parts over multiple transmissions are also applicable to the repetition occasions described in the alternate implementations.

According to a fifth solution, a UE may implement CSI multiplexing in PUSCH. According to Clause 5.4 (UE CSI computation time) of 3GPP TS 38.214 (v16.0.0) (incorporated herein by reference), when the CSI request field on a DCI triggers a CSI report(s) on PUSCH, if the first uplink symbol to carry the corresponding CSI report(s) including the effect of the timing advance, starts earlier than at symbol $Z_{ref}$, the UE may ignore the scheduling DCI if no HARQ-ACK or transport block is multiplexed on the PUSCH. When the CSI request field on a DCI triggers a CSI report(s) on PUSCH, if the first uplink symbol to carry the n-th CSI report including the effect of the timing advance, starts earlier than at symbol $Z'_{ref}(n)$, the UE may ignore the scheduling DCI if the number of triggered reports is one and no HARQ-ACK or transport block is multiplexed on the PUSCH.

Otherwise, the UE is not required to update the CSI for the n-th triggered CSI report. When the CSI request field on a DCI triggers a CSI report(s) on PUSCH, the UE is to provide a valid CSI report for the n-th triggered report, if the first uplink symbol to carry the corresponding CSI report(s) including the effect of the timing advance, starts no earlier than at symbol $Z_{ref}$, and if the first uplink symbol to carry the n-th CSI report including the effect of the timing advance, starts no earlier than at symbol $Z'_{ref}(n)$, where $Z_{ref}$ is defined as the next uplink symbol with its CP starting $T_{proc,CSI}=(Z)(2048+144)\cdot\kappa 2^{-\mu}\cdot T_C$ after the end of the last symbol of the PDCCH triggering the CSI report(s), and where $Z'_{ref}(n)$, is defined as the next uplink symbol with its CP starting $T_{proc,CSI}=(Z')(2048+144)\cdot\kappa 2^{-\mu}\cdot T_C$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report. Z, Z' and μ are defined as:

a) $(Z_1, Z_1')$ of the table 5.4-1 if the CSI is triggered without a PUSCH with either transport block or HARQ-ACK or both when L=0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or b) $(Z_1, Z_1')$ of the table 5.4-2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or c) $(Z_1, Z_1')$ of the table 5.4-2 if the CSI to be transmitted corresponds to wideband frequency-granularity where the reportQuantity is set to 'ssb-Index-SINR', or reportQuantity is set to 'cri-SINR', or d) $(Z_3, Z_3')$ of the table 5.4-2 if reportQuantity is set to 'cri-RSRP' or 'ssb-Index-RSRP', where Xu is according to UE reported capability beamReportTiming and KB; is according to UE reported capability beamSwitchTiming, e.g., as defined in 3GPP TS 38.306, or e) $(Z_2, Z_2')$ of table 5.4-2 otherwise.

TABLE 5.4-1

CSI computation delay requirement 1

| μ | $Z_1$ [symbols] | |
|---|---|---|
| | $Z_1$ | $Z'_1$ |
| 0 | 10 | 8 |
| 1 | 13 | 11 |
| 2 | 25 | 21 |
| 3 | 43 | 36 |

TABLE 5.4-2

CSI computation delay requirement 2

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2$ + $KB_1$) | $X_2$ |
| 3 | 97 | 85 | 152 | 140 | min(97, $X_3$ + $KB_2$) | $X_3$ |

According to Clause 6.4 (UE PUSCH preparation procedure time) of 3GPP TS 38.214 (v16.0.0) (incorporated herein by reference), the UE transmits the transport block if the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where $L_2$ is defined as the next uplink symbol with its CP starting $T_{proc,2}$=max$((N_2+d_{2,1})(2048+144)\cdot\kappa 2^{-\mu}\cdot T_C, d_{2,2})$ after the end of the reception of the last symbol of the PDCCH carrying the DCI scheduling the PUSCH.

$N_2$ is based on u of Table 6.4-1 and Table 6.4-2 for UE processing capability 1 and 2 respectively, where u corresponds to the one of $(\mu_{DL},\mu_{UL})$ resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and x is defined in clause 4.1 of [4, TS 38.211].

If the first symbol of the PUSCH allocation consists of DM-RS only, then $d_{2,1}=0$, otherwise $d_{2,1}=1$. If the UE is configured with multiple active component carriers, the first uplink symbol in the PUSCH allocation further includes the effect of timing difference between component carriers, e.g., as given in 3GPP TS 38.133. If the scheduling DCI triggered a switch of BWP, $d_{2,2}$ equals to the switching time as defined in [11, TS 38.133], otherwise $d_{2,2}=0$.

For a UE that supports capability 2 on a given cell, the processing time according to UE processing capability 2 is applied if the high layer parameter processingType2Enabled in PUSCH-ServingCellConfig is configured for the cell and set to enable. If the PUSCH indicated by the DCI is overlapping with one or more PUCCH channels, then the transport block is multiplexed (e.g., following the procedure in clause 9.2.5 of 3GPP TS 38.213), otherwise the transport block is transmitted on the PUSCH indicated by the DCI. Otherwise, the UE may ignore the scheduling DCI.

The value of $T_{proc,2}$ is used both in the case of normal and extended cyclic prefix.

TABLE 6.4-1

PUSCH preparation time for PUSCH timing capability 1

| μ | PUSCH preparation time $N_2$ [symbols] |
|---|---|
| 0 | 10 |
| 1 | 12 |
| 2 | 23 |
| 3 | 36 |

TABLE 6.4-2

PUSCH preparation time for PUSCH timing capability 2

| μ | PUSCH preparation time $N_2$ [symbols] |
|---|---|
| 0 | 5 |
| 1 | 5.5 |
| 2 | 11 for frequency range 1 |

According to Clause 5.3 (UE PDSCH processing procedure time) of 3GPP TS 38.214 (v16.0.0) (incorporated herein by reference), PDSCH processing time for different PDSCH processing capabilities are specified as below:

TABLE 5.3-1

PDSCH processing time for PDSCH processing capability 1

PDSCH decoding time $N_1$ [symbols]

| μ | dmrs-AdditionalPosition = pos0 in DMRS-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 5.3-2

PDSCH processing time for PDSCH processing capability 2

| μ | PDSCH decoding time $N_1$ [symbols] dmrs-AdditionalPosition = pos0 in DMRS-DownlinkConfig in both of dmrs-Downlink ForPDSCH-MappingTypeA, dmrs-DownlinkForPDSCH-MappingTypeB |
|---|---|
| 0 | 3 |
| 1 | 4.5 |
| 2 | 9 for frequency range 1 |

In one embodiment of the fifth solution, a UE receives a PDCCH triggering at least one CSI report on a PUSCH and determines from which symbol of the PUSCH the UE multiplexes a CSI report of the triggered at least one CSI report, based on PUSCH start timing with respect to an end of reception of the last symbol of the PDCCH carrying DCI scheduling the PUSCH. Additionally, the determination may be made based on demodulation reference signal ("DM-RS") configuration for the PUSCH. That is, if the first uplink symbol available to carry the CSI report (e.g., the first PUSCH symbol that does not carry DM-RS) including the effect of the timing advance is earlier than at symbol $Z_{ref}$ (e.g., the next uplink symbol with its cyclic prefix ("CP") starting $T_{proc,CSI}=(Z)(2048+144)\cdot\kappa 2^{-\mu}\cdot T_C$ after the end of the last symbol of the PDCCH triggering the CSI report), the UE transmits the CSI report at the earliest from a PUSCH symbol corresponding to (or associated with) the symbol $Z_{ref}$.

In another embodiment of the fifth solution, a UE receives a PDCCH triggering at least one CSI report on a PUSCH and determines from which symbol of the PUSCH the UE multiplexes a CSI report of the triggered at least one CSI report, based on PUSCH start timing with respect to an end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the CSI report. That is, if the first uplink symbol available to carry the CSI report including the effect of the timing advance is earlier than at symbol $Z'_{ref}$ (e.g., the next uplink symbol with its CP starting $T_{proc,CSI}=(Z)(2048+144)\cdot\kappa 2^{-\mu}\cdot T_C$ after the end of the last symbol in time of the latest of the aperiodic CSI-RS for channel measurement, CSI-IM, and NZP CSI-RS for interference measurement, which are used for the CSI report), the UE transmits the CSI report at the earliest from a PUSCH symbol corresponding to (or associated with) the symbol $Z'_{ref}$.

For the above embodiments, if the first uplink symbol available to carry the CSI report including the effect of the timing advance is no earlier than at symbols $Z_{ref}$ and $Z'_{ref}$, the UE transmits the CSI report from the first available symbol of the PUSCH to carry the CSI report (e.g., first PUSCH symbol that does not carry DM-RS).

If a UE has high priority (e.g., URLLC) uplink data to transmit and also needs to perform urgent CSI reporting, a network entity may schedule a PUSCH with small slot offset $K_2$ with respect to the last slot including a PDCCH scheduling the PUSCH, where the slot offset $K_2$ determines the first slot including the PUSCH. Since PUSCH preparation time is shorter than CSI computation delay, the UE can start with transmission of uplink shared channel ("UL-SCH") (e.g., transport block) in the beginning part of the PUSCH and can multiplex CSI in the later part of the PUSCH. Similarly, since PDSCH processing time is shorter than CSI computation delay, the UE can start with transmission of HARQ-ACK information in the beginning part of the PUSCH and can multiplex CSI in the later part of the PUSCH that satisfies timing conditions related to the minimum required CSI computation delay.

In other embodiments of the fifth solution, the UE further receives an indication of a priority of the CSI report and determines based on the indicated priority whether to ignore the scheduling DCI for the PUSCH (if no HARQ-ACK or transport block is multiplexed on the PUSCH) or whether to not update the CSI report (otherwise), if the first uplink symbol available to carry the CSI report including the effect of the timing advance is earlier than at symbols $Z_{ref}$ and $Z'_{ref}$. If the CSI report is configured (e.g., via RRC) or dynamically indicated (e.g., via DCI) with a high priority, the UE multiplexes the CSI report at the earliest from a PUSCH symbol corresponding to (or associated with) the symbol Z, which is a later symbol among symbols $Z_{ref}$ and $Z'_{ref}$. If the CSI report is configured (e.g., via RRC) or dynamically indicated (e.g., via DCI) with a low priority or if the UE does not receive an explicit indication of the priority of the CSI report, the UE ignores the scheduling DCI or not to update the CSI report.

In one implementation of the fifth solution, if the number of PUSCH symbols satisfying the above timing conditions (e.g., transmitting the CSI report at the earliest from a PUSCH symbol corresponding to (or associated with) the symbol Z, which is a later symbol among symbols $Z_{ref}$ and $Z'_{ref}$ is small and cannot provide required REs for the CSI report, the UE may omit the CSI report. For example, for CSI part 1 transmission on the PUSCH with UL-SCH, the number of coded modulation symbols per layer for CSI part 1 transmission, denoted as $Q'_{CSI-part1}$, is determined as follows:

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-S}-1} K_r} \right\rceil, \right.$$

$$\left. \left\lceil \alpha \cdot \sum_{l=Z}^{N^{PUSCH}_{symb,all}-1} M^{UCI}_{sc}(l) \right\rceil - Q''_{ACK/CG-U} \right\},$$

where parameters $O_{CSI-1}$, $L_{CSI-1}$, $\beta^{PUSCH}_{offset}$, $M^{UCI}_{sc}(l)$, $C_{UL-SCH}$, $K_r$, $N^{PUSCH}_{symb,all}$, and $\alpha$ are defined in Clause 6.3.2.4 of TS 38.212, and where $Q''_{ACK/CG-UCI}$ is the number of coded modulation symbols per layer for HARQ-ACK information and Configured Grant-UCI (CG-UCI) multiplexed from the PUSCH symbol Z to the PUSCH symbol $N^{PUSCH}_{symb,all}-1$.

In other embodiments, a UE receives an implicit or explicit indication of a first symbol within the PUSCH, where the CSI report is multiplexed from the symbol Z.

Figure 5:
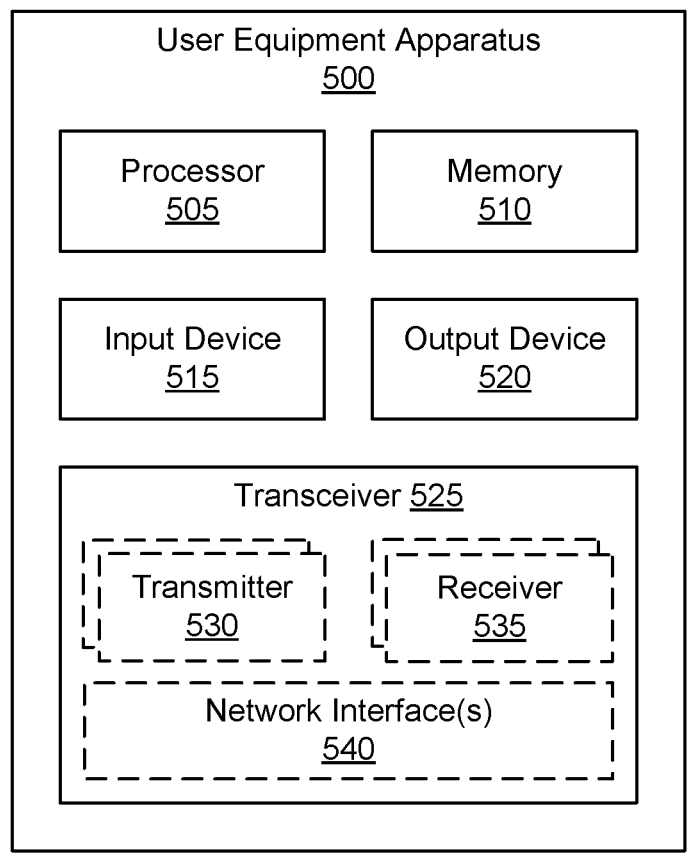
FIG. 5 is a block diagram illustrating one embodiment of a user equipment apparatus that may be used for channel state information processing and reporting.

FIG. 5 depicts a user equipment apparatus 500 that may be used with channel state information processing and reporting, according to embodiments of the disclosure. In various embodiments, the user equipment apparatus 500 is used to implement one or more of the solutions described above. The user equipment apparatus 500 may be one embodiment of the remote unit 105, described above. Furthermore, the user equipment apparatus 500 may include a processor 505, a memory 510, an input device 15, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement one or more of the UE behaviors described herein, according to the disclosed solutions and embodiments.

In some embodiments, the processor 505 determines an availability of CSI processing units on a sub-symbol level where a duration of the sub-symbol is less than a symbol duration that corresponds to a subcarrier spacing of an UL channel for transmission of at least one corresponding CSI report. In one embodiment, the processor 505 processes the at least one corresponding CSI report on the determined available CSI processing units in response to a number of CSI processing units becoming available at the sub-symbol level being equal to or greater than a number of CSI processing units needed for processing the at least one corresponding CSI report.

In one embodiment, the processor 505 determines the duration of the sub-symbol based on a duration of a symbol that corresponds to a maximum subcarrier spacing configured for the UE regardless the subcarrier spacing associated with transmitting the at least one corresponding CSI report on the UL channel. In some embodiments, the processor 505 determines the duration of the sub-symbol based on a fraction of the symbol duration of the subcarrier spacing associated with transmitting the at least one corresponding CSI report.

In certain embodiments, the processor 505 waits the determined duration of the sub-symbol prior to processing the at least one corresponding CSI report in response to the determined available CSI processing units being less than the number of CSI processing units needed for processing the at least one corresponding CSI report.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to channel state information processing and reporting. For example, the memory 510 may store various parameters, configurations, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all, or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 110, such as the UL transmissions described herein. Similarly, one or more receivers 535 may be used to receive DL communication signals from the base unit 110, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
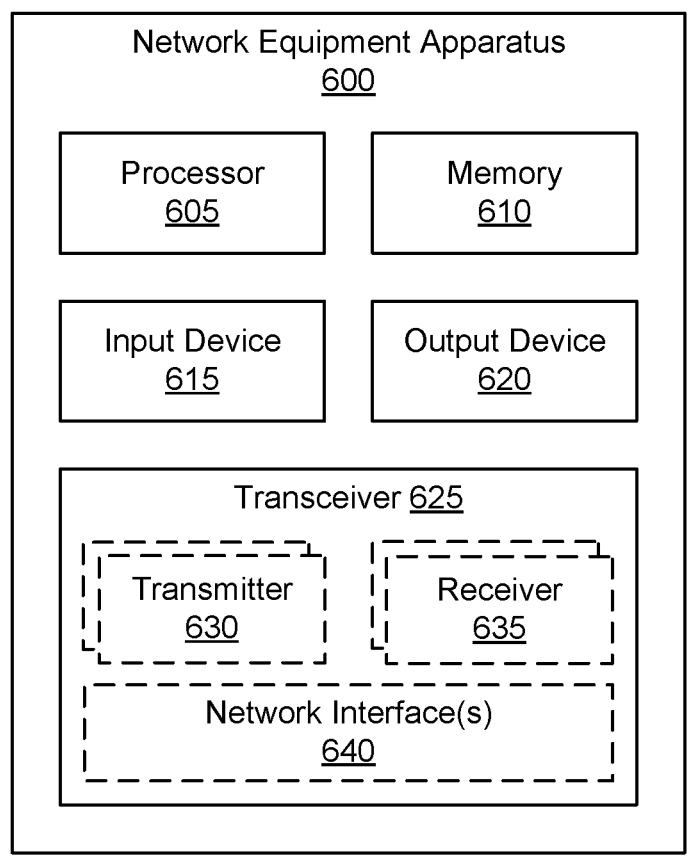
FIG. 6 is a block diagram illustrating one embodiment of a network equipment apparatus that may be used for channel state information processing and reporting.

FIG. 6 depicts a network equipment apparatus 600 that may be used with channel state information processing and reporting, according to embodiments of the disclosure. The network equipment apparatus 600 may be one embodiment of a RAN node, such as the base unit 110 or gNB described above. Furthermore, the base network equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the network equipment apparatus 600 may not include any input device 615 and/or output device 620. In various embodiments, the network equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network equipment apparatus 600 is a RAN node (e.g., gNB) that supports irregular subcarriers spacing as described herein. Here, the processor 605 controls the network equipment apparatus 600 to perform the behaviors described herein.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to channel state information processing and reporting. For example, the memory 610 may store various parameters, configurations, policies, and the like as described above. In certain embodiments, the memory 610 also stores program code and related data, such as an operating system or other controller algorithms operating on the network equipment apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network equipment apparatus 600, such as a smart watch, smart glasses, a heads-up display, or the like. Further, the output device 620 may be a component of a smart phone, a personal digital assistant, a television, a tablet computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network equipment apparatus 600 may have any suitable number of transmitters 630 and receivers 635. Further, the transmitter(s) 625 and the receiver(s) 630 may be any suitable type of transmitters and receivers.

Figure 7:
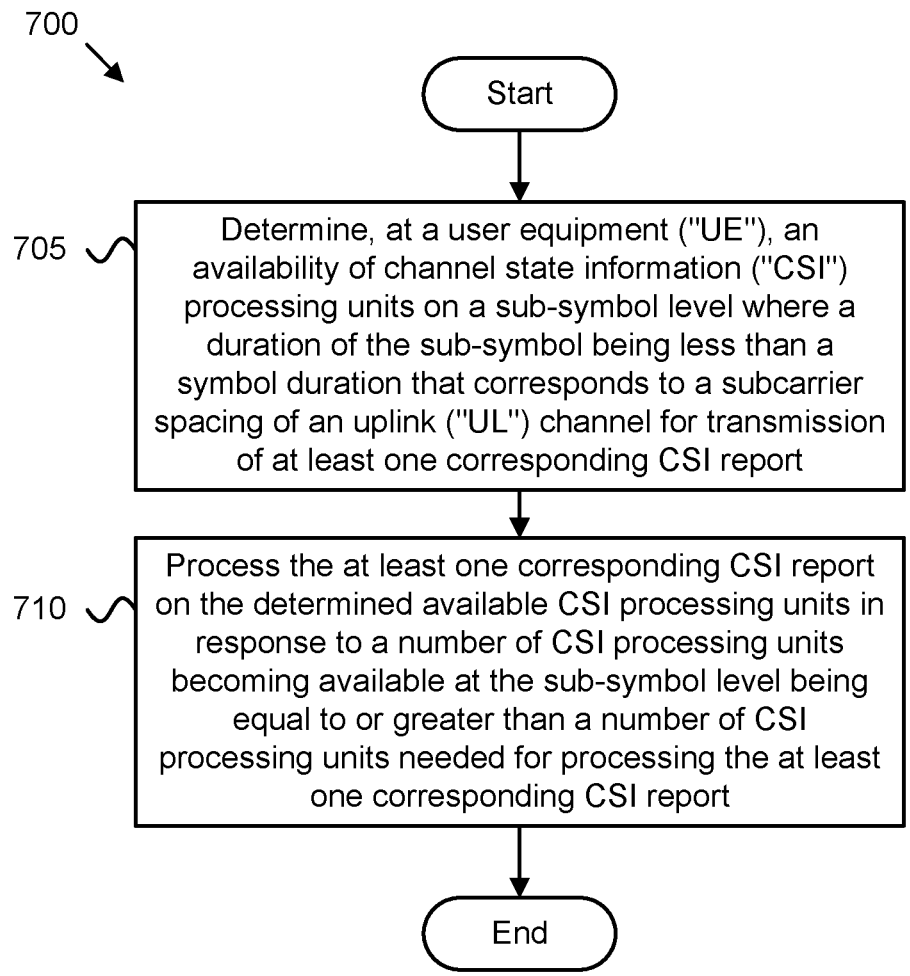
FIG. 7 is a flowchart diagram illustrating one embodiment of a method for channel state information processing and reporting.

FIG. 7 is a flowchart diagram of a method 700 for supporting channel state information processing and reporting. The method 700 may be performed by a UE, such as the remote unit 105 and/or the user equipment apparatus 500. In some embodiments, the method 700 may be performed by a processor executing program code, for example, a microcontroller, a microprocessor, a CPU, a GPU, an auxiliary processing unit, a FPGA, or the like.

The method 700 includes determining 705, at a user equipment ("UE"), an availability of channel state information ("CSI") processing units on a sub-symbol level, a duration of the sub-symbol being less than a symbol duration that corresponds to a subcarrier spacing of an uplink ("UL") channel for transmission of at least one corresponding CSI report.

The method 700 includes processing 710 the at least one corresponding CSI report on the determined available CSI processing units in response to a number of CSI processing units becoming available at the sub-symbol level being equal to or greater than a number of CSI processing units needed for processing the at least one corresponding CSI report. The method 700 ends.

Disclosed herein is a first method for channel state information processing and reporting, according to embodiments of the disclosure. The first method may be performed by a user equipment, such as the remote unit 105 and/or the user equipment apparatus 500. The first method includes determining, at a user equipment ("UE"), an availability of channel state information ("CSI") processing units on a sub-symbol level where a duration of the sub-symbol being less than a symbol duration that corresponds to a subcarrier spacing of an uplink ("UL") channel for transmission of at least one corresponding CSI report.

In some embodiments, the first method includes processing the at least one corresponding CSI report on the determined available CSI processing units in response to a number of CSI processing units becoming available at the sub-symbol level being equal to or greater than a number of CSI processing units needed for processing the at least one corresponding CSI report.

In one embodiment, the first method includes determining the duration of the sub-symbol based on a duration of a symbol that corresponds to a maximum subcarrier spacing configured for the UE regardless the subcarrier spacing associated with transmitting the at least one corresponding CSI report on the UL channel. In some embodiments, the duration of the symbol that corresponds to the maximum subcarrier spacing is predefined for the subcarrier spacing associated with transmitting the at least one corresponding CSI report and the maximum subcarrier spacing configured for the UE, the UE preconfigured with different symbol durations that each correspond to different maximum subcarrier spacings for the UE.

In some embodiments, the first method includes determining the duration of the sub-symbol based on a fraction of the symbol duration of the subcarrier spacing associated with transmitting the at least one corresponding CSI report. In various embodiments, the symbol duration corresponds to the subcarrier spacing associated with transmitting the at least one corresponding CSI report on a physical uplink shared channel ("PUSCH") and/or a physical uplink control channel ("PUCCH").

In one embodiment, the fraction of the symbol duration is predefined for the subcarrier spacing associated with transmitting the at least one corresponding CSI report and the maximum subcarrier spacing configured for the UE, the UE preconfigured with different predefined fractions that each correspond to different subcarrier spacings corresponding to different CSI reports.

In one embodiment, the first method includes waiting the determined duration of the sub-symbol prior to processing the at least one corresponding CSI report in response to the determined available CSI processing units being less than the number of CSI processing units needed for processing the at least one corresponding CSI report. In further embodiments, determining the availability of CSI processing units occurs at least one sub-symbol after detecting a trigger for the at least one corresponding CSI report.

In one embodiment, the number of sub-symbols after detecting a trigger for the at least one corresponding CSI report corresponds to the maximum subcarrier spacing configured for the UE. In certain embodiments, the number of sub-symbols after detecting a trigger for the at least one corresponding CSI report corresponds to the subcarrier spacing associated with the at least one corresponding CSI report. In some embodiments, determining the availability of CSI processing units continues to occur after each sub-symbol in response to the number of CSI processing units needed for processing the at least one corresponding report being unavailable.

Disclosed herein is a first apparatus for channel state information processing and reporting, according to embodiments of the disclosure. The first apparatus may be implemented by a user equipment, such as the remote unit 105 and/or the user equipment apparatus 800. The first apparatus includes a transceiver that, in one embodiment, is operable to communicate with a wireless mobile network, e.g., a RAN to receive at least one channel state information ("CSI") reference signal. In further embodiments, the first apparatus includes a processor that determines, in response to the CSI reference signal, an availability of CSI processing units on a sub-symbol level where a duration of the sub-symbol being less than a symbol duration that corresponds to a subcarrier spacing of an uplink ("UL") channel for transmission of at least one corresponding CSI report.

In further embodiments, the processor processes the at least one corresponding CSI report on the determined available CSI processing units in response to a number of CSI processing units becoming available at the sub-symbol level being equal to or greater than a number of CSI processing units needed for processing the at least one corresponding CSI report.

In one embodiment, the processor determines the duration of the sub-symbol based on a duration of a symbol that corresponds to a maximum subcarrier spacing configured for the UE regardless the subcarrier spacing associated with transmitting the at least one corresponding CSI report on the UL channel. In some embodiments, the duration of the symbol that corresponds to the maximum subcarrier spacing is predefined for the subcarrier spacing associated with transmitting the at least one corresponding CSI report and the maximum subcarrier spacing configured for the UE, the UE preconfigured with different symbol durations that each correspond to different maximum subcarrier spacings for the UE.

In some embodiments, the processor determines the duration of the sub-symbol based on a fraction of the symbol duration of the subcarrier spacing associated with transmitting the at least one corresponding CSI report. In various embodiments, the symbol duration corresponds to the subcarrier spacing associated with transmitting the at least one corresponding CSI report on a physical uplink shared channel ("PUSCH") and/or a physical uplink control channel ("PUCCH").

In one embodiment, the fraction of the symbol duration is predefined for the subcarrier spacing associated with transmitting the at least one corresponding CSI report and the maximum subcarrier spacing configured for the UE, the UE preconfigured with different predefined fractions that each correspond to different subcarrier spacings corresponding to different CSI reports.

In one embodiment, the processor waits the determined duration of the sub-symbol prior to processing the at least one corresponding CSI report in response to the determined available CSI processing units being less than the number of CSI processing units needed for processing the at least one corresponding CSI report. In further embodiments, determining the availability of CSI processing units occurs at least one sub-symbol after detecting a trigger for the at least one corresponding CSI report.

In one embodiment, the number of sub-symbols after detecting a trigger for the at least one corresponding CSI report corresponds to the maximum subcarrier spacing configured for the UE. In certain embodiments, the number of sub-symbols after detecting a trigger for the at least one corresponding CSI report corresponds to the subcarrier spacing associated with the at least one corresponding CSI report. In some embodiments, determining the availability of CSI processing units continues to occur after each sub-symbol in response to the number of CSI processing units needed for processing the at least one corresponding report being unavailable.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), comprising:
    determining an availability of channel state information ("CSI") processing units on a sub-symbol level, wherein a duration of a sub-symbol is based on a duration of a symbol that corresponds to a maximum subcarrier spacing configured for the UE regardless of a subcarrier spacing of an uplink ("UL") channel that is used for transmitting at least one corresponding CSI report, wherein the duration of the sub-symbol is less than the duration of a symbol that corresponds to the subcarrier spacing of the UL channel; and
    processing the at least one corresponding CSI report on available CSI processing units in response to a number of CSI processing units becoming available at the sub-symbol level being equal to or greater than a number of CSI processing units needed for processing the at least one corresponding CSI report.

2. The method of claim 1, wherein the duration of the symbol that corresponds to the maximum subcarrier spacing is predefined for the subcarrier spacing associated with transmitting the at least one corresponding CSI report and the maximum subcarrier spacing configured for the UE, the UE preconfigured with different symbol durations that each correspond to different maximum subcarrier spacings for the UE.

3. The method of claim 1, further comprising determining the duration of the sub-symbol based on a fraction of the symbol duration of the subcarrier spacing associated with transmitting the at least one corresponding CSI report.

4. The method of claim 3, wherein the symbol duration corresponds to the subcarrier spacing associated with transmitting the at least one corresponding CSI report on a physical uplink shared channel ("PUSCH") and/or a physical uplink control channel ("PUCCH").

5. The method of claim 3, wherein the fraction of the symbol duration is predefined for the subcarrier spacing associated with transmitting the at least one corresponding CSI report and the maximum subcarrier spacing configured for the UE, the UE preconfigured with different predefined fractions that each correspond to different subcarrier spacings corresponding to different CSI reports.

6. The method of claim 1, further comprising waiting the determined duration of the sub-symbol prior to processing the at least one corresponding CSI report in response to the determined available CSI processing units being less than the number of CSI processing units needed for processing the at least one corresponding CSI report.

7. The method of claim 1, wherein determining the availability of CSI processing units occurs at least one sub-symbol after detecting a trigger for the at least one corresponding CSI report.

8. The method of claim 7, wherein the number of sub-symbols after detecting a trigger for the at least one corresponding CSI report corresponds to the maximum subcarrier spacing configured for the UE.

9. The method of claim 1, wherein determining the availability of CSI processing units continues to occur after each sub-symbol in response to the number of CSI processing units needed for processing the at least one corresponding report being unavailable.

10. A user equipment (UE) for wireless communication, comprising:
    at least one memory; and
    at least one processor coupled with the at least one memory and configured to cause the UE to:
        determines an availability of channel state information ("CSI") processing units on a sub-symbol level, wherein a duration of a sub-symbol is based on a duration of a symbol that corresponds to a maximum subcarrier spacing configured for the UE regardless of a subcarrier spacing of an uplink ("UL") channel that is used for transmitting at least one corresponding CSI report, wherein the duration of the sub-symbol is less than the duration of a symbol that corresponds to the subcarrier spacing of the UL channel; and
        processes the at least one corresponding CSI report on available CSI processing units in response to a number of CSI processing units becoming available at the sub-symbol level being equal to or greater than a number of CSI processing units needed for processing the at least one corresponding CSI report.

11. The UE of claim 10, wherein the duration of the symbol that corresponds to the maximum subcarrier spacing is predefined for the subcarrier spacing associated with transmitting the at least one corresponding CSI report and the maximum subcarrier spacing configured for the UE, the UE preconfigured with different symbol durations that each correspond to different maximum subcarrier spacings for the UE.

12. The UE of claim 10, wherein the processor determines the duration of the sub-symbol based on a fraction of the symbol duration of the subcarrier spacing associated with transmitting the at least one corresponding CSI report.

13. The UE of claim 12, wherein the symbol duration corresponds to the subcarrier spacing associated with transmitting the at least one corresponding CSI report on a physical uplink shared channel ("PUSCH") and/or a physical uplink control channel ("PUCCH").

14. The UE of claim 12, wherein the fraction of the symbol duration is predefined for the subcarrier spacing associated with transmitting the at least one corresponding CSI report and the maximum subcarrier spacing configured for the UE, the UE preconfigured with different predefined fractions that each correspond to different subcarrier spacings corresponding to different CSI reports.

15. The UE of claim 10, wherein the processor waits the determined duration of the sub-symbol prior to processing the at least one corresponding CSI report in response to the determined available CSI processing units being less than the number of CSI processing units needed for processing the at least one corresponding CSI report.

16. The UE of claim 10, wherein determining the availability of CSI processing units occurs at least one sub-symbol after detecting a trigger for the at least one corresponding CSI report.

17. The UE of claim 16, wherein the number of sub-symbols after detecting a trigger for the at least one corresponding CSI report corresponds to the maximum subcarrier spacing configured for the UE.

18. The UE of claim 10, wherein determining the availability of CSI processing units continues to occur after each sub-symbol in response to the number of CSI processing units needed for processing the at least one corresponding report being unavailable.

19. A method performed by a network equipment, comprising:
    transmitting configuration information indicating a sub-symbol duration, wherein the sub-symbol duration is based on a duration of a symbol that corresponds to a maximum subcarrier spacing regardless of a subcarrier spacing of an uplink ("UL") channel that is used for transmitting at least one channel state information ("CSI") report, and wherein the sub-symbol duration is less than the duration of a symbol that corresponds to the subcarrier spacing of the UL channel;

indicating a number of CSI processing units required for processing the at least one CSI report; and receiving the at least one CSI report that is generated based on availability of CSI processing units on a sub-symbol level and in accordance with the configuration information and indicated number of CSI processing units.

20. A network equipment for wireless communication, comprising:

at least one memory; and at least one processor coupled with the at least one memory and configured to cause the network equipment to:

transmit configuration information indicating a sub-symbol duration, wherein the sub-symbol duration is based on a duration of a symbol that corresponds to a maximum subcarrier spacing regardless of a subcarrier spacing of an uplink ("UL") channel that is used for transmitting at least one channel state information ("CSI") report, and wherein the sub-symbol duration is less than the duration of a symbol that corresponds to the subcarrier spacing of the UL channel;

indicate a number of CSI processing units required for processing the at least one CSI report; and receive the at least one CSI report that is generated based on availability of CSI processing units on a sub-symbol level and in accordance with the configuration information and indicated number of CSI processing units.

* * * * *